(12) United States Patent
Rosero et al.

(10) Patent No.: US 11,084,408 B2
(45) Date of Patent: Aug. 10, 2021

(54) DEDICATED MASSAGE FUNCTION BUTTON FOR VEHICLE

(71) Applicant: HONDA MOTOR CO., LTD., Tokyo (JP)

(72) Inventors: Fernando M. Rosero, Marysville, OH (US); Jeffrey Hudson Scheurer, II, Columbus, OH (US); Yousuf S. Riad, Dublin, OH (US); Cody D. Grebe, Marysville, OH (US); Brandon R. Mott, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 15/941,862

(22) Filed: Mar. 30, 2018

(65) Prior Publication Data
US 2019/0299831 A1   Oct. 3, 2019

(51) Int. Cl.
*G06F 3/0482* (2013.01)
*B60N 2/90* (2018.01)
(Continued)

(52) U.S. Cl.
CPC ............... *B60N 2/976* (2018.02); *A61H 7/00* (2013.01); *A61H 9/0078* (2013.01); *B60N 2/914* (2018.02);
(Continued)

(58) Field of Classification Search
CPC .............................. G06F 3/0482; G06F 19/321
See application file for complete search history.

(56) References Cited

U.S. PATENT DOCUMENTS 6,087,942 A * 7/2000 Sleichter, III ............ B60N 2/56
340/576
7,311,681 B1 * 12/2007 Vaccarella ...................... 601/46
(Continued)

FOREIGN PATENT DOCUMENTS

DE   102016003687 A1   9/2016
EP      3119370 A1   1/2017

OTHER PUBLICATIONS

Audi, 2017 A8 OWNER'S Manual, pp. 54-57.
(Continued)

*Primary Examiner* — Rayeez R Chowdhury
(74) *Attorney, Agent, or Firm* — Arent Fox LLP; Mark Duell

(57) ABSTRACT

A vehicle includes a vehicle seat including a plurality of actuatable massage elements. The vehicle includes a dedicated physical massage function button located on a dash or a console of the vehicle. The vehicle includes a display configured to present a menu of vehicle configuration options when the dedicated physical massage function button is held for a threshold amount of time. The vehicle includes a memory and a processor communicatively coupled to the memory. The processor is configured to receive, from a user, a selection of the configuration options for the vehicle seat presented on the display. The processor is configured to receive a signal indicating that the dedicated massage function button is pressed. The processor is configured to activate the plurality of actuatable massage elements according to the selection of configuration options in response to the signal indicating that the dedicated massage function button is pressed.

20 Claims, 8 Drawing Sheets

(51) Int. Cl.
*A61H 7/00* (2006.01)
*A61H 9/00* (2006.01)

(52) U.S. Cl.
CPC .......... *A61H 2201/0149* (2013.01); *A61H 2201/5007* (2013.01); *A61H 2201/5025* (2013.01); *A61H 2201/5035* (2013.01); *A61H 2201/5038* (2013.01); *A61H 2201/5043* (2013.01); *A61H 2203/0431* (2013.01)

(56) References Cited

U.S. PATENT DOCUMENTS

| | | | |
|---|---|---|---|
| 9,630,533 B2 | 4/2017 | Misch et al. | |
| 2002/0091341 A1* | 7/2002 | Ray | A61H 7/004 601/95 |
| 2002/0175828 A1* | 11/2002 | Macey | A61H 33/005 340/12.5 |
| 2003/0010043 A1* | 1/2003 | Ferragut, II | F25D 29/00 62/126 |
| 2008/0051683 A1 | 2/2008 | Tanizawa et al. | |
| 2013/0019174 A1* | 1/2013 | Gil | G06F 3/04812 715/711 |
| 2014/0025258 A1 | 1/2014 | Lem et al. | |
| 2014/0032043 A1 | 1/2014 | Line et al. | |
| 2014/0207333 A1* | 7/2014 | Vandivier | B60N 2/976 701/36 |
| 2015/0251573 A1* | 9/2015 | Misch | B60N 2/914 297/452.41 |
| 2016/0008597 A1* | 1/2016 | Chen | A61N 1/3603 607/60 |
| 2016/0346543 A1* | 12/2016 | Chen | A61N 1/36021 |
| 2017/0124035 A1* | 5/2017 | Buttolo | G06F 40/186 |
| 2018/0273050 A1* | 9/2018 | Tertoolen | G08G 1/096861 |

OTHER PUBLICATIONS

Cozzia Qi User Manual, CZ-730/Qi, Accessed Dec. 11, 2017.
Infinity 8500 Series Quick Start Guide, Accessed on Dec. 11, 2017.
The BMW 7 Series Owner's Manual, Online Edition for Part No. 01402964330-V1/15, pp. 88-89.

* cited by examiner

DEDICATED MASSAGE FUNCTION BUTTON FOR VEHICLE

BACKGROUND

The subject matter disclosed herein relates to vehicle seating and, more particularly, to control systems and method for vehicle massage seats.

Conventional passenger vehicles include driver-side and passenger-side front seats oriented facing a normal forward direction of travel. Vehicle seats generally include controls for adjusting the position of the seat. More advanced vehicle seats include power movement, adjustable lumbar support, adjustable side bolsters, seat and back heating, sound systems, and ventilation systems.

Massage chairs are typically stationary chairs that include various actuators for mimicking a massage performed by a masseuse. The actuators may be electro-mechanical and/or pneumatic. A massage function may be desirable for a vehicle seat. For example, a massage may relieve muscle tension due to extended driving or sitting in the vehicle.

In view of the foregoing, a control system for a massage seat for use in a vehicle is provided. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of controlling a massage function of a vehicle seat may be performed by an electronic control unit (ECU) or processor of a vehicle. The method may include receiving a selection of configuration options for the vehicle seat from configuration options presented on a display of the vehicle. The method may include receiving a signal indicating that a dedicated massage function button is pressed a first time. The method may include activating the massage function according to the selection of configuration options in response to the signal indicating that the dedicated massage function button is pressed the first time.

In another aspect, a vehicle control system controls a massage function of a vehicle seat. The vehicle control system may include a dedicated physical massage function button located on a dash or a console of the vehicle. The vehicle control system may include a display configured to present at least a selection of vehicle configuration settings. The vehicle control system may include a memory and a processor communicatively coupled to the memory. The processor may be configured to receive, from a user, a selection of configuration options for the vehicle seat from the vehicle configuration settings presented on the display. The processor may be configured to receive a signal indicating that the dedicated massage function button is pressed a first time. The processor may be configured to activate the massage function according to the selection of configuration options in response to the signal indicating that the dedicated massage function button is pressed the first time.

In another aspect, a vehicle includes a vehicle seat including a plurality of actuatable massage elements. The vehicle may include a dedicated physical massage function button located on a dash or a console of the vehicle. The vehicle may include a display configured to present at least a selection of vehicle configuration settings. The vehicle may include a memory and a processor communicatively coupled to the memory. The processor may be configured to receive, from a user, a selection of configuration options for the vehicle seat from configuration options displayed on the display. The processor may be configured to receive a signal indicating that the dedicated massage function button is pressed a first time. The processor may be configured to activate the plurality of actuatable massage elements according to the selection of configuration options in response to the signal indicating that the dedicated massage function button is pressed the first time.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
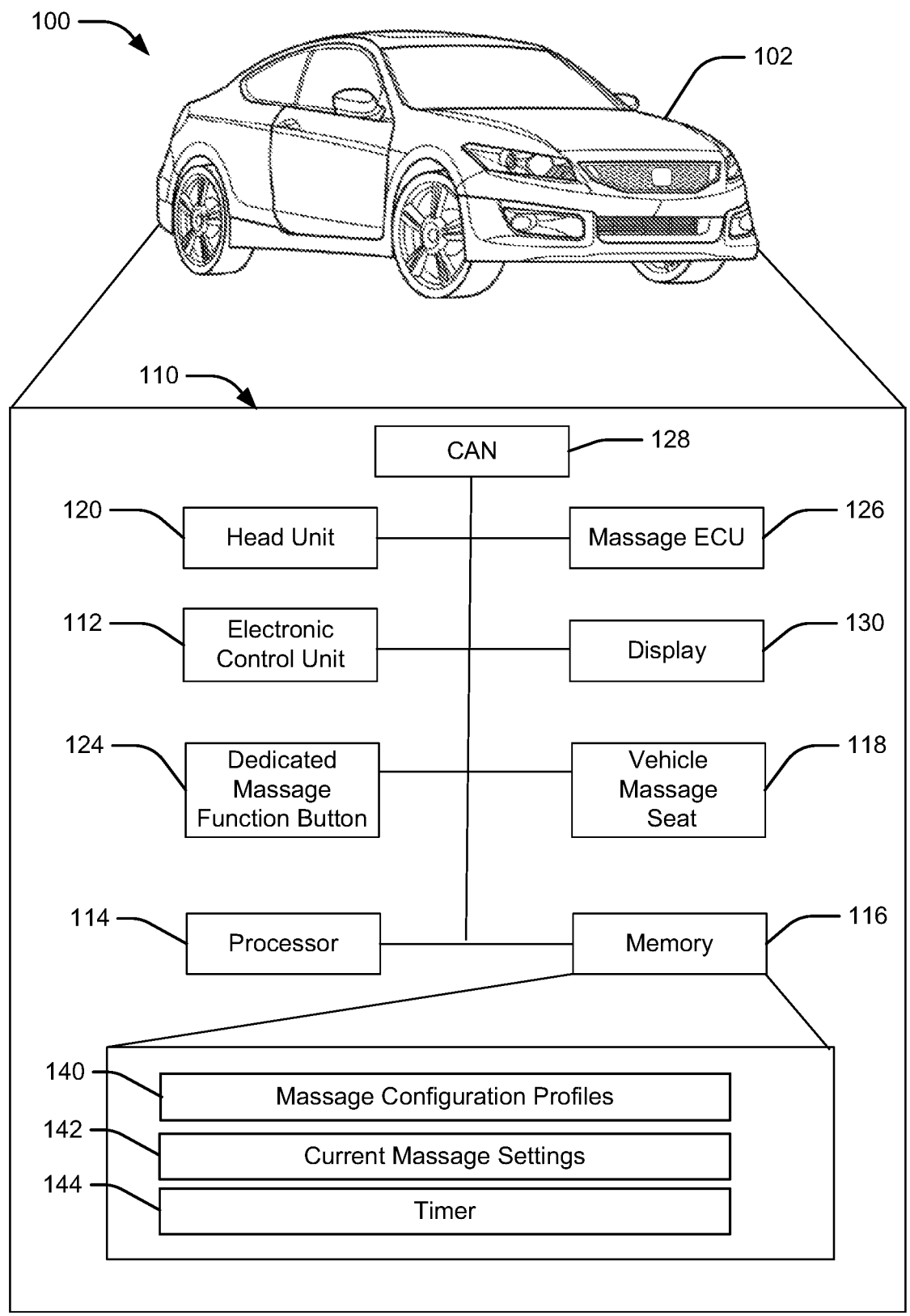
FIG. 1 illustrates a schematic view of an example operating environment of a massage seat control system in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

The term "graphical user interface," "GUI," or "user interface," as used herein, can refer to a type of interface that allows users to interact with electronic devices, the vehicle system, the vehicle, vehicle applications or the like, through graphical icons, visual indicators such as secondary notation, text-based, type command labels, text navigation, and the like.

The term "screen," "display screen," or "display," as used herein, can refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and the like.

A vehicle massage seat may include multiple individually controllable massage elements. For example, the massage elements may include inflatable bladders located in the seat bottom and seat back under a trim material. The massage elements may be located to the left and right to provide pressure to the user's back on either side of the spine when the bladders are inflated. The massage elements may be activated in various patterns, for example, to mimic various styles of massage or to target specific muscles. The massage seat may be configured with a customized massage pattern and intensity selected by the user.

Traditional control systems for a massage chair may not be suitable for a vehicle. Configuration of a conventional massage chair typically uses numerous buttons located on a custom controller. The addition of numerous buttons to a vehicle may be confusing and detract from essential driving controls, so it may be advantageous to limit the number of controls for a vehicle massage seat. The controls may be implemented using a vehicle human-machine interface such as a vehicle infotainment system. Such implementation, however, may involve navigation through various menus, which may also be distracting. In some cases, a vehicle infotainment system may limit available menus while the vehicle is moving to avoid driver distractions.

Aspects of the present disclosure provide for a dedicated massage function button. The dedicated massage function button may be located on a vehicle dashboard or center console. The dedicated massage function button may provide simple activation and control of a massage seat. For example, a single press of the dedicated massage function button may activate the massage seat using previously configured settings. Subsequent presses of the dedicated massage function button may cycle the massage seat through a set of parameter settings such as massage pattern and intensity. If the dedicated massage function button is held for a threshold time (e.g., at least 1 second, at least 2 seconds, or longer), a display of the vehicle may provide a configuration interface that may be controlled using multipurpose interface controls (e.g., touchscreen or dial). The driver seat and passenger seat(s) may each be associated with a respective dedicated massage function button.

Turning to FIG. 1, a schematic view of an example operating environment 100 of a massage seat control system 110 and example methods according to an aspect of the disclosure are provided. The massage seat control system 110 may reside within a vehicle 102. The components of the massage seat control system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the massage seat control system 110, among others, including vehicle body monitoring systems, vehicle HVAC systems, vehicle audio systems, vehicle video systems, vehicle infotainment systems, vehicle telephone systems, and the like. The massage seat control system 110 may include one or more dedicated massage function buttons 124 that may also be connected to the ECU 112 to provide control of a vehicle massage seat 128 via a massage ECU 126, as described in further detail below. The massage seat control system 110 may also include a processor 114 and a memory 116 that communicate with the ECU 112, head unit 120, display 130, and controller area network (CAN) 128.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the massage seat control system 110.

The dedicated massage function button 124 may be a physical button located on a dashboard or center console of the vehicle 102. The dedicated massage function button 124 may, for example, be formed of molded plastic. The dedicated massage function button 124 may include one or more lights such as light emitting diodes (LEDs) for indicating a status of the dedicated massage function button 124. For example, in one aspect, the dedicated massage function button 124 includes three LEDs that indicate a current selected intensity of a massage function. In another aspect, the status may be indicated by an intensity, pattern, and/or color of one or more LEDs. The dedicated massage function button 124 may include a symbol or indicia to distinguish the dedicated massage function button 124 from other buttons. For example, the dedicated massage function button 124 may be located near or adjacent to a seat heating control button.

The massage ECU 126 may be an electronic control unit configured to control components of the vehicle massage seat 118. The massage ECU 126 may be an additional LIN node on a seat control system. The massage ECU 126 may receive input from a head unit 120 via the CAN 128. For example, the massage ECU may receive parameters such as a massage mode and intensity. The massage ECU 126 may generate a massage sequence based on the parameters. The massage ECU 126 may control the massage elements of the vehicle massage seat 118 according to the massage sequence.

The memory 116 may store instructions executable by the processor 114 for carrying out the methods described herein. Further, the memory 116 may store parameters for carrying out the methods described herein. For example, the memory 116 may store massage configuration profiles 140, current massage settings 142, and timer 144. The massage configuration profiles 140 may store one or more profiles of massage parameters selected by a user. The profile may be stored according to a user identification, key identifier, or seat position, among other identifiers. The current massage settings 142 may store the current parameters used for an active massage sequence. For example, the current massage settings 142 may be loaded from a stored massage configuration profile 140 and altered via the dedicated massage function button 124 or via a massage configuration menu presented on the display 130. The timer 144 may store a duration or stop time for a timer. The processor 114 may compare a current time with the timer 144 to determine whether the timer has expired.

The vehicle 102 may include a head unit 120. The head unit 120 may control a vehicle infotainment system and include a display 130. For example, the head unit 120 may be centrally mounted in a dashboard of the vehicle 102. The head unit 120 may control the display 130 to present images and menus associated with various features of the vehicle 102. For example, the head unit 120 may control the display 130 to display a massage control menu that allows a user to configure current massage settings 142 and/or a massage configuration profiles 140. The head unit 120 may include various input features such as buttons, dials, switches, touch pads, or touch screens. In an aspect, the head unit 120 may include a primary input device that may be used to navigate the menus presented on the display 130.

Figure 2:
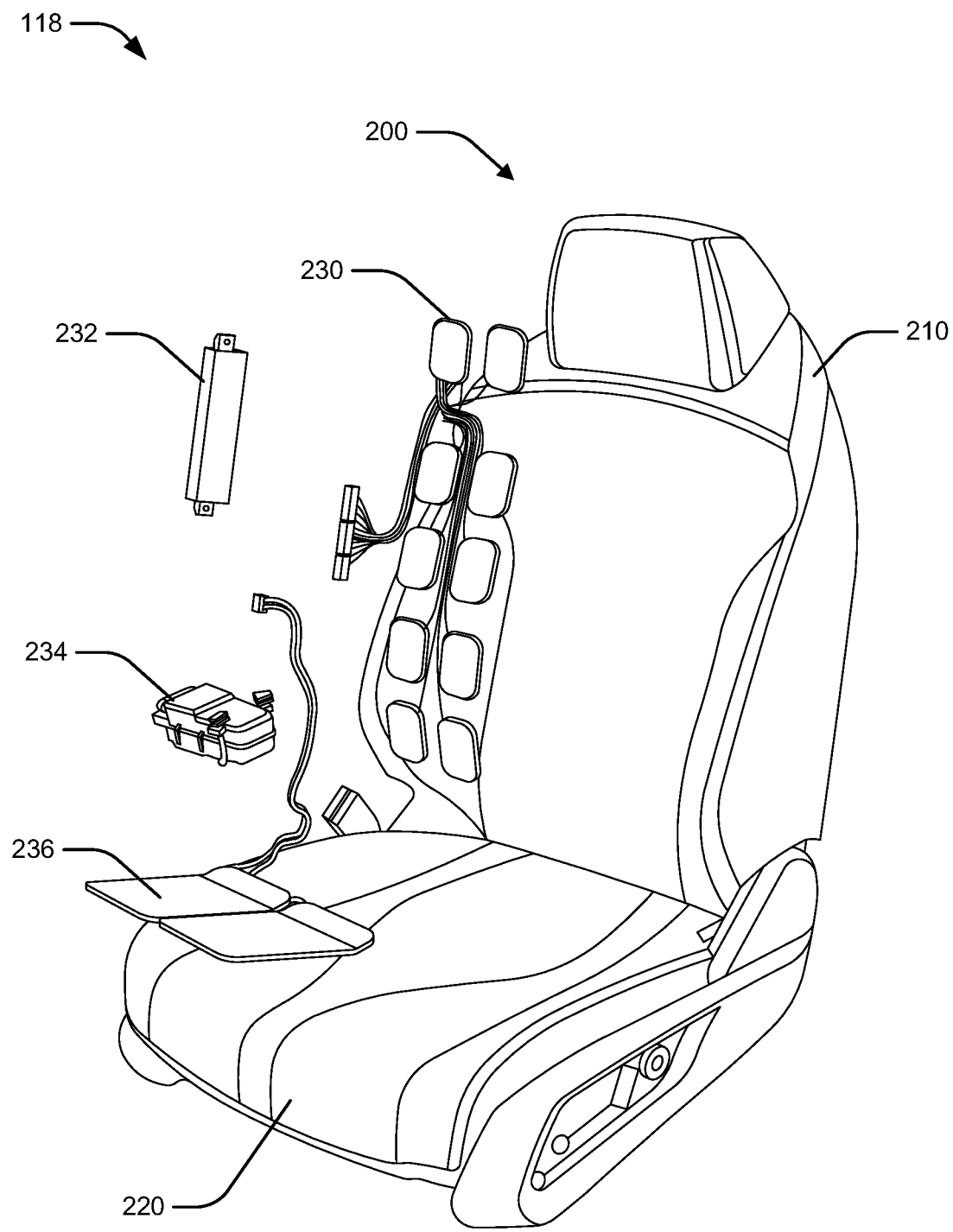
FIG. 2 illustrates an exploded view of massage seat components in accordance with aspects of the present disclosure.

FIG. 2 illustrates a perspective view of an example vehicle massage seat 118. The vehicle massage seat 118 may include a seat frame 200 including a seat back 210 and seat bottom 220. The seat frame 200 may be constructed as a conventional vehicle seat using a rigid frame covered by padding and a trim material (e.g., fabric or leather). The seat frame 200 may include space for massage components including a back massage bladder assembly 230, a massage ECU valve unit 232, a massage pump assembly 234, and an anti-fatigue bladder assembly 236.

The back massage bladder assembly 230 may be located in the seat back 210. For example, the back massage bladder assembly 230 may be located between a back foam pad and a topper pad. In an aspect, the back massage bladder assembly 230 may include multiple individually inflatable bladders. For example, the illustrated back massage bladder assembly 230 may include ten bladders arranged in two columns. The two columns may be aligned to each side of the user's spine to massage muscle tissue in the user's back.

The massage ECU valve unit 232 may be located in the seat back 210 behind a bolster support to prevent the user from exerting pressure on the massage ECU valve unit 232. The massage ECU valve unit 232 may receive signals from the massage ECU 126 and control pneumatic valves to provide inflation or deflation of massage elements of the back massage bladder assembly 230 and the anti-fatigue bladder assembly 236.

The massage pump assembly 234 may be located toward the rear of the seat bottom 220 under a seat cushion to dampen vibrations. The massage pump assembly 234 may be a pneumatic pump that supplies pressurized air to the massage ECU valve unit 232 for operating the massage elements.

The anti-fatigue bladder assembly 236 may be located in the seat bottom 220. For example, the anti-fatigue bladder assembly 236 may be located on top of a cushion spring under a cushion foam pad. The anti-fatigue bladder assembly 236 may include two or more bladders. The anti-fatigue bladder assembly 236 may inflate to massage the user's gluteus muscles. The inflation of the anti-fatigue bladder assembly 236 may also relieve pressure on the user's legs and promote blood circulation to the user's legs.

Figure 3:
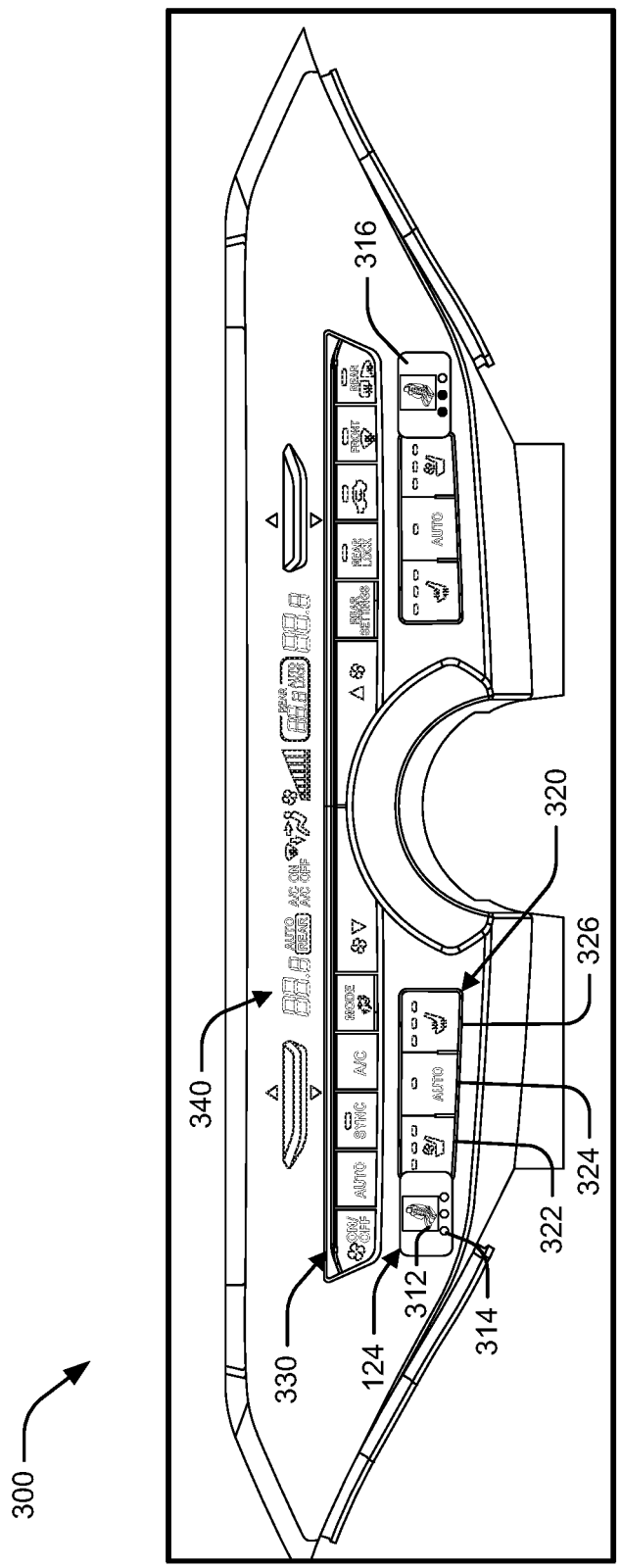
FIG. 3 illustrates an example vehicle console including a dedicated massage function button in accordance with aspects of the present disclosure.

FIG. 3 illustrates an example vehicle console 300 including a dedicated massage function button 124. The dedicated massage function button 124 may include an indicia 312 and lights 314. The indicia 312 may be a symbol representing the massage function. For example, the indicia 312 may include a seat with massage elements. The lights 314 may indicate a status of the massage function. For example, as illustrated, the lights 314 may include three LEDs indicating a current intensity of the massage function. When the massage function is off, the lights 314 may be off. One light 314 may indicate a low intensity, two lights may indicate a medium intensity, and three lights may indicate a high intensity.

The dedicated massage function button 124 may be located on the vehicle console 300 in a group of seat functions 320. The group of seat functions 320 may include a seat ventilation button 322, an automatic button 324, and a seat heating button 326. The vehicle console 300 may also include a climate control button group 330 including various buttons to control a HVAC system of the vehicle 102. The vehicle console 300 may also include an indicator group 340 including various indicators related to vehicle functions. In an aspect, the indicator group 340 may include an indicator of a massage seat status, for example, instead of the lights 314.

In an aspect, a massage function may be provided for both the front driver seat and the front passenger seat. A dedicated passenger massage function button 316 may be located on a passenger side of the vehicle console 300 opposite the dedicated massage function button 124 for the driver seat. The dedicated passenger massage function button 316 may operate in the same manner as the dedicated massage function button 124, except for the front passenger seat instead of the front driver seat. In the illustrated example, the dedicated passenger massage function button 316 may be set to the medium intensity as indicated by the two lights.

Figure 4:
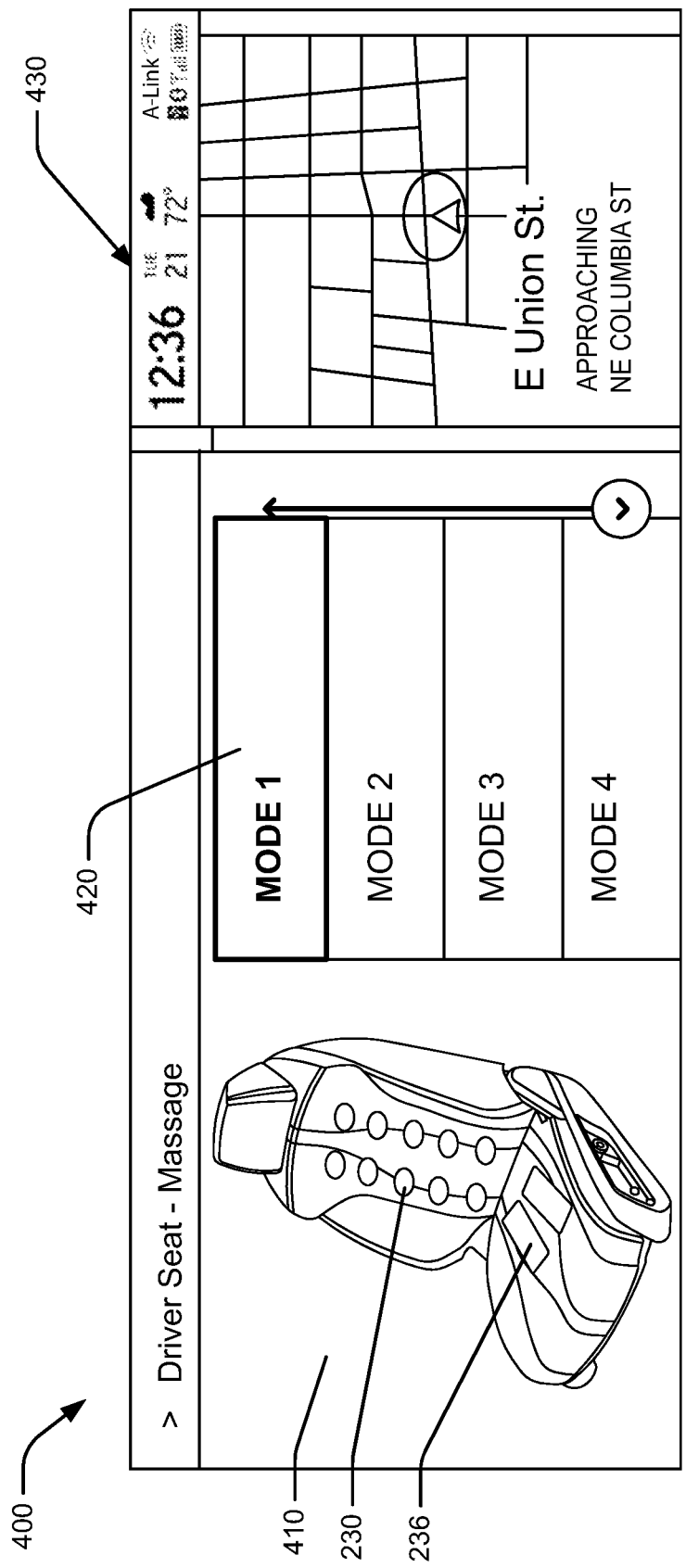
FIG. 4 illustrates an example massage configuration interface in accordance with aspects of the present disclosure.

FIG. 4 illustrates an example massage configuration interface 400. The massage configuration interface 400 may be presented by the head unit 120 on the display 130. The massage configuration interface 400 may use a portion of the display 130 and share the display 130 with an interface for another function. For example, a display portion 430 may include a navigation screen and an information bar including a time, a date, and weather conditions.

The massage configuration interface 400 may be accessed by holding the dedicated massage function button 124 for a threshold time or selecting a massage configuration option via a menu system of the head unit 120. Pressing and holding the dedicated massage function button 124 to access the massage configuration interface 400 may eliminate a need to navigate through multiple levels of menus to reach the massage configuration interface 400. Additionally, the dedicated massage function button 124 may efficiently receive different inputs associated with the massage function by distinguishing between a single press and a press and hold.

The massage configuration interface 400 may display a seat representation 410 indicating the position of massage elements (e.g., the back massage bladder assembly 230 and the anti-fatigue bladder assembly 236) and a mode menu 420 indicating available massage modes. Each massage mode may activate different massage elements in different patterns. When a mode is selected on the mode menu 420, the seat representation 410 may illustrate the massage mode by lighting the massage elements in the pattern defined by the currently highlighted massage mode. Accordingly, the user may select a massage mode that targets specific locations. The massage modes on the mode menu 420 may include descriptive names or short descriptions of the massage mode. In an aspect, once the user selects a massage mode using the head unit 120, the massage configuration interface 400 may display additional configuration options for the massage. For example, the massage configuration interface 400 may allow the user to select an intensity or duration of the massage. The massage configuration interface 400 may also allow the user to select whether the selected configuration options are for a current massage or to be stored for future activation via the dedicated massage function button 124. Once the user has selected the massage configuration options, the head unit 120 may store the selected options in the massage configuration profiles 140 and/or the current massage settings 142 as indicated by the user.

In an aspect, the massage configuration profiles 140 may allow the user to choose the massage configuration options that will be activated when the user presses the dedicated massage seat button. For example, the massage configuration profiles 140 may include an activation option that may include a selection of one of: activating the last selected massage configuration options or activating a stored set of massage configuration options. For example, the current massage settings 142 may remain in memory 116 after a massage has finished and pressing the dedicated massage function button 124 may initiate a massage according to the last selected massage configuration options remaining in memory 116. As another example, the massage configuration profiles 140 may store a configuration for a favorite massage configuration to be activated by pressing the dedicated massage function button 124. In either example, pressing the dedicated massage function button 124 may allow initiation of a massage according to configuration options selected by the user. Thus, for example, the massage function may be easily activated while driving without the need for the driver to navigate menus to select the desired configuration options. Further, if the vehicle 102 has an ability to identify different drivers (e.g., based on key or key-fob), the memory 116 may store current massage settings 142 and/or a massage configuration profile 140 for each driver. Accordingly, activation of the dedicated massage function button 124 may initiate the massage according to the configuration options selected by the current driver.

Figure 5:
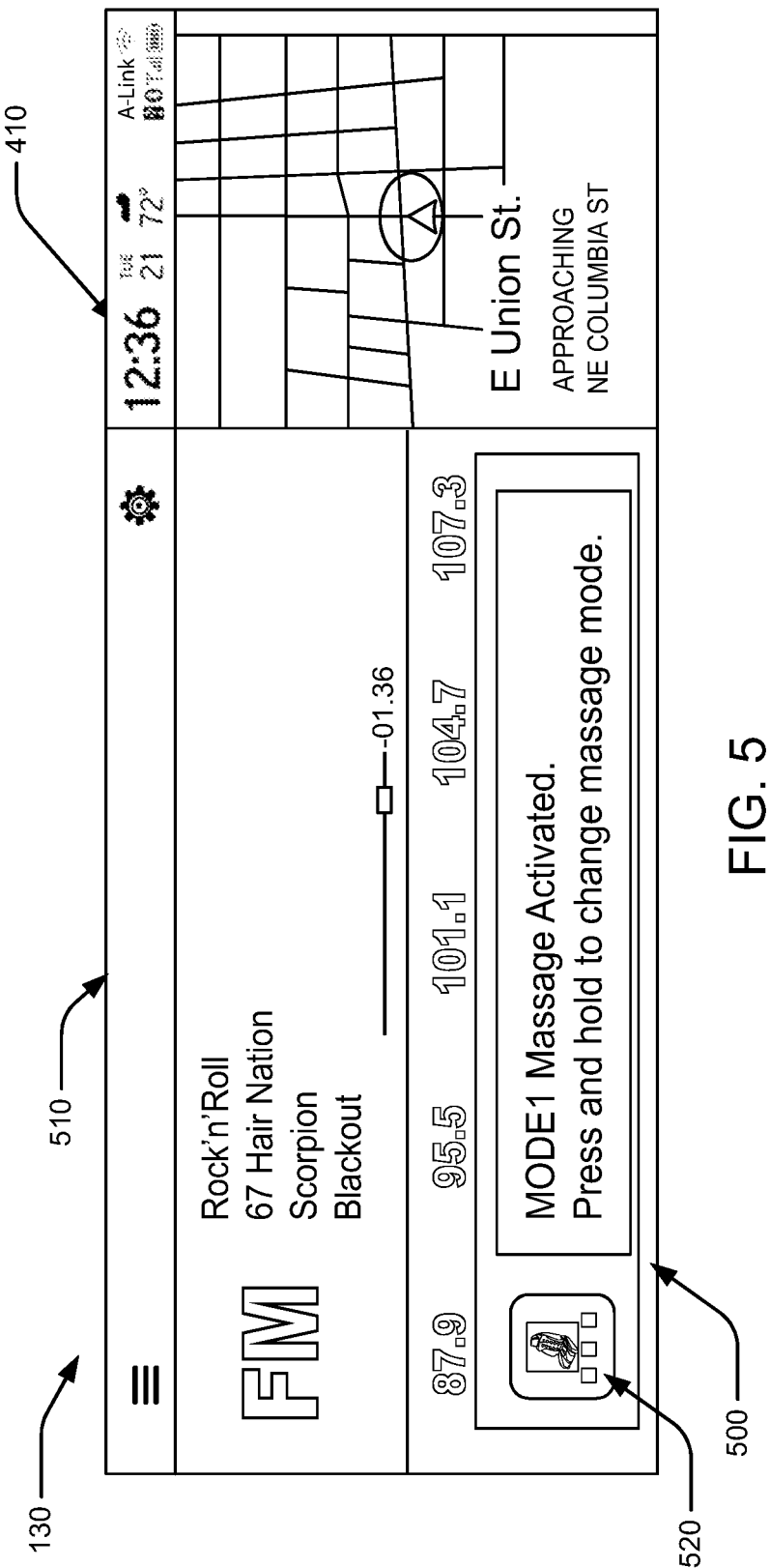
FIG. 5 illustrates an example massage function notification in accordance with aspects of the present disclosure.

FIG. 5 illustrates an example massage function notification 500. The massage function notification 500 may be displayed on the display 130 as a pop-up or toast that covers a portion of a currently displayed screen. For example, as illustrated, the massage function notification 500 may be presented over a media selection interface 510. More generally, the massage function notification 500 may be presented over any interface that is different than the massage configuration interface 400.

The massage function notification 500 may be presented on the display 130 in response to a user pressing the dedicated massage function button 124. The massage function notification 500 may identify a massage mode that was activated by pressing the dedicated massage function button 124. The massage function notification 500 may also indicate the current intensity by including a button image 520 including representations of the lights 314. The massage function notification 500 may also provide instructions for navigating to the massage configuration interface 400, for example, by pressing and holding the dedicated massage function button 124.

Figure 6:
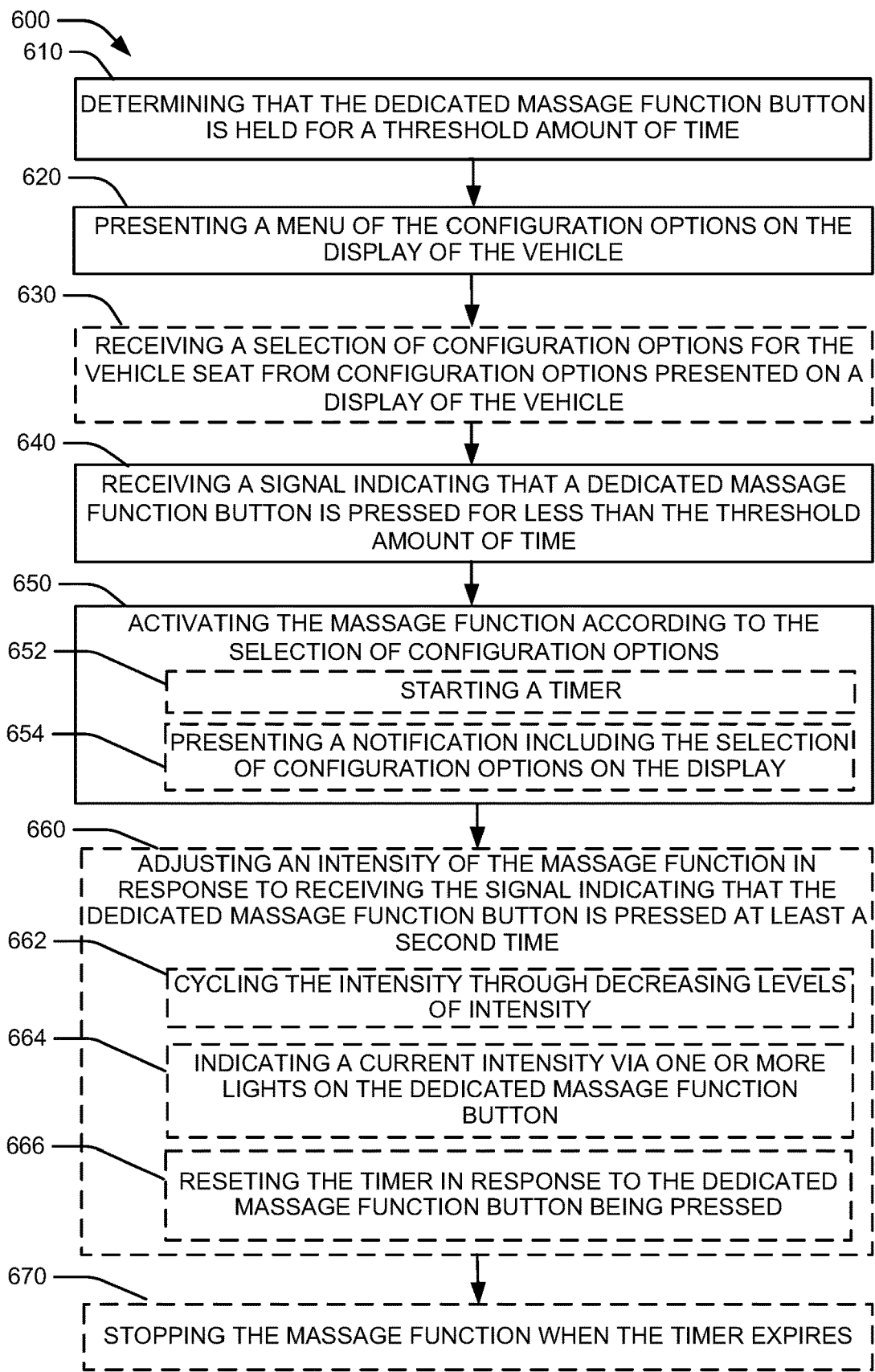
FIG. 6 is a flowchart of an example method of controlling a massage function of a vehicle seat in accordance with aspects of the present disclosure.

FIG. 6 illustrates a flowchart of an example method 600 for controlling a vehicle massage seat 118 using a dedicated massage function button 124. The method 600 may be performed by a massage seat control system 110 within a vehicle 102.

In block 610, the method 600 may include determining that a dedicated massage function button is held for a threshold amount of time. In an aspect, for example, the ECU 112 and/or the processor 114 may determine that the dedicated massage function button 124 is held for the threshold amount of time based on a signal received via the CAN 128. The threshold amount of time may be a preconfigured threshold, for example, one second, two seconds, or another amount of time sufficient to distinguish a press and hold from a simple press.

In block 620, the method 600 may include presenting a menu of the configuration options on a display of the vehicle in response to the dedicated massage function button being held for a threshold amount of time. In an aspect, for example, the ECU 112 and/or the processor 114 may control the display 130 to present the massage configuration interface 400 including the mode menu 420 of configuration options. The block 660 may be performed in response to determining that the dedicated massage function button is held for a threshold amount of time in block 610.

In block 630, the method 600 may optionally include receiving a selection of configuration options for the vehicle seat from configuration options presented on the display of the vehicle. In an aspect, for example, the ECU 112 and/or the processor 114 may receive the selection of configuration options for the vehicle massage seat 118 from configuration options presented on a display 130 of the vehicle 102. For example, the configuration options may be presented as the massage configuration interface 400. The ECU 112 and/or the processor 114 may store the selection of configuration options as a massage configuration profile 140. For example, the selection of configuration options may be associated with a selected driver or passenger profile, an active vehicle key, or another identifier of a user. The selection of configuration options may also be saved as a most recent selection of configuration options.

In block 640, the method 600 may include receiving a signal indicating that a dedicated massage function button is pressed for less than the threshold time. In an aspect, for example, the ECU 112 and/or the processor 114 may receive a signal indicating that the dedicated massage function button 124 is pressed for less than the threshold time. For example, the signal may be received via the CAN 128. The signal indicating the dedicated massage function button 124 is pressed the for less than the threshold time may be generated a first time whenever a massage function is off. For example, the dedicated massage function button 124 may be pressed for the first time after the vehicle 102 has been turned on. If the massage function is turned off or times out, a subsequent press of the dedicated massage function button 124 may generate the signal indicating the dedicated massage function button 124 is pressed a first time.

In block 650, the method 600 may include activating the massage function according to a stored selection of configuration options in response to the signal indicating that the dedicated massage function button is pressed for less than the threshold amount of time. In an aspect, for example, the ECU 112 and/or the processor 114 may activate the massage function via the massage ECU 126 according to the selection of configuration options stored in the massage configuration profiles 140 in response to the signal indicating that the dedicated massage function button 124 is pressed for less than the threshold amount of time. In an aspect, in block 652, the block 650 may optionally include starting a timer in response to the signal indicating that the dedicated massage function button is pressed for less than the threshold amount of time. For example, the ECU 112 and/or the processor 114 may start the timer 144 to measure a duration of a massage sequence. In another aspect, in block 654, the block 650 may include presenting a notification including the selection of configuration options on the display. For example, the ECU 112 and/or the processor 114 may present the notification 500 including the selection of configuration options (i.e., the massage configuration profile 140) on the display 130 when activating the massage function.

In block 660, the method 600 may optionally include adjusting an intensity of the massage function in response to receiving the signal indicating that the dedicated massage function button is pressed at least a second time. In an aspect, for example, the ECU 112 and/or the processor 114 may receive the signal indicating that the dedicated massage function button 124 is pressed at least the second time via the CAN 128. The ECU 112 and/or the processor 114 may adjust the intensity of the massage function via the massage ECU 126. For example, the massage ECU 126 may decrease a volume of air used to inflate the massage elements.

In an aspect, adjusting an intensity of the massage function in block 660 may include, at block 662, cycling the intensity through decreasing levels of intensity. For example, the intensity may start off at a high intensity when the dedicated massage function button 124 is pressed a first time and be decreased to a medium intensity when the dedicated massage function button 124 is pressed a second time. A third press of the dedicated massage function button 124 may reduce the intensity to a low intensity. A fourth press of the dedicated massage function button 124 may turn off the massage function. In another aspect, in block 664, the block 660 may include indicating a current intensity via one or more lights on the dedicated massage function button. For example, the lights 314 on the dedicated massage function button 214 may indicate the current intensity. In another aspect, in block 666, the block 660 may include resetting the timer in response to the dedicated massage function button being pressed prior to the expiration of the timer 144. For example, the ECU 112 and/or the processor 114 may reset the timer 144 in response to the dedicated massage function button 124 being pressed prior to the expiration of the timer 144. Resetting the timer 144 may allow the massage function to run for the full duration of the massage sequence at the newly selected intensity.

In block 670, the method 600 may optionally include stopping the massage function when the timer expires. In an aspect, for example, the ECU 112 and/or the processor 114 may stop the massage function when the timer 144 expires.

For example, the ECU 112 and/or the processor 114 may control the massage ECU 126 to turn off the massage pump assembly 234. The benefits of massage may be reduced after extended periods of time. Stopping the massage based on a timer may reduce wear on components of the massage system.

Figure 7:
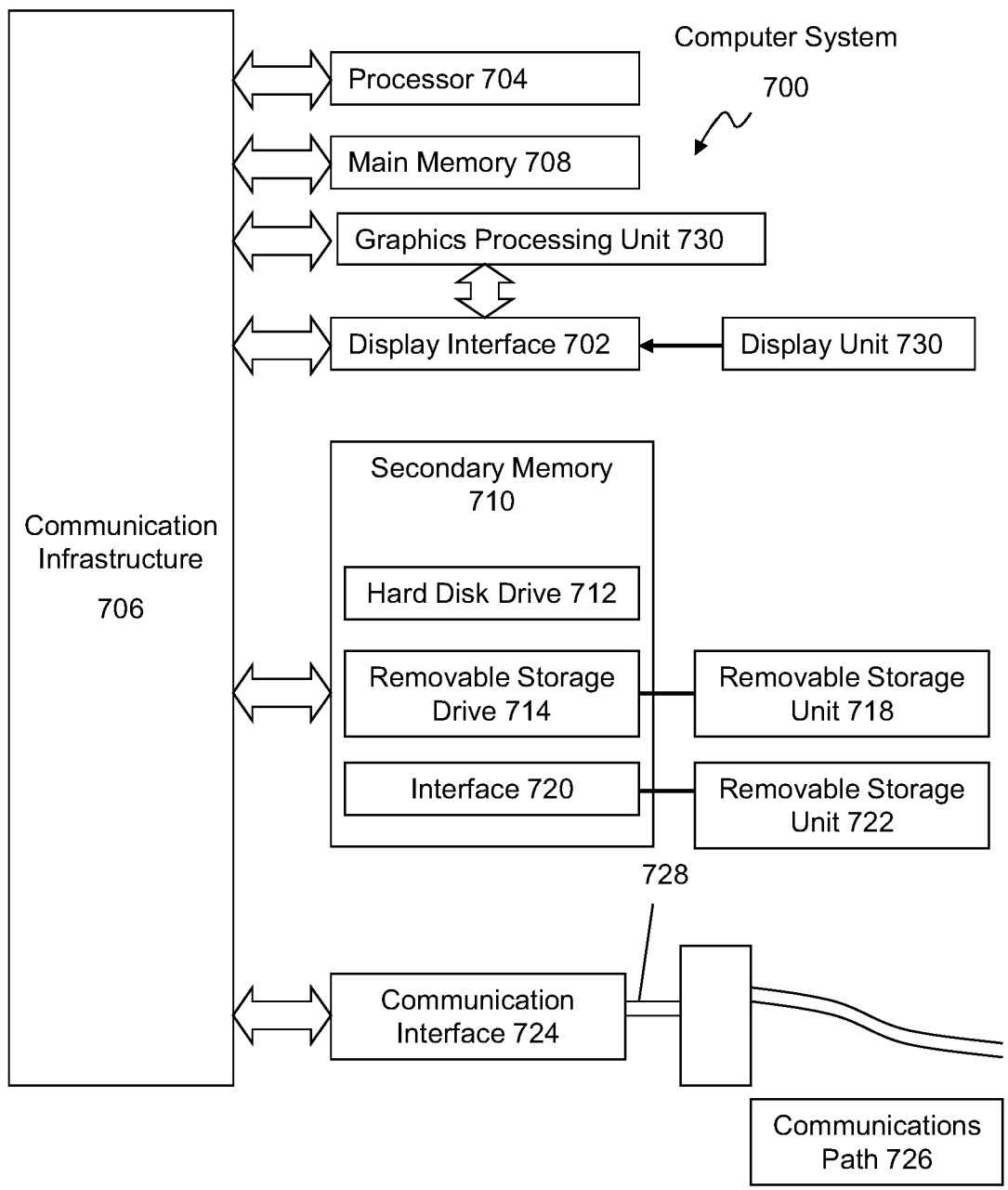
FIG. 7 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 780, a hard disk installed in hard disk drive 770, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard disk drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 8:
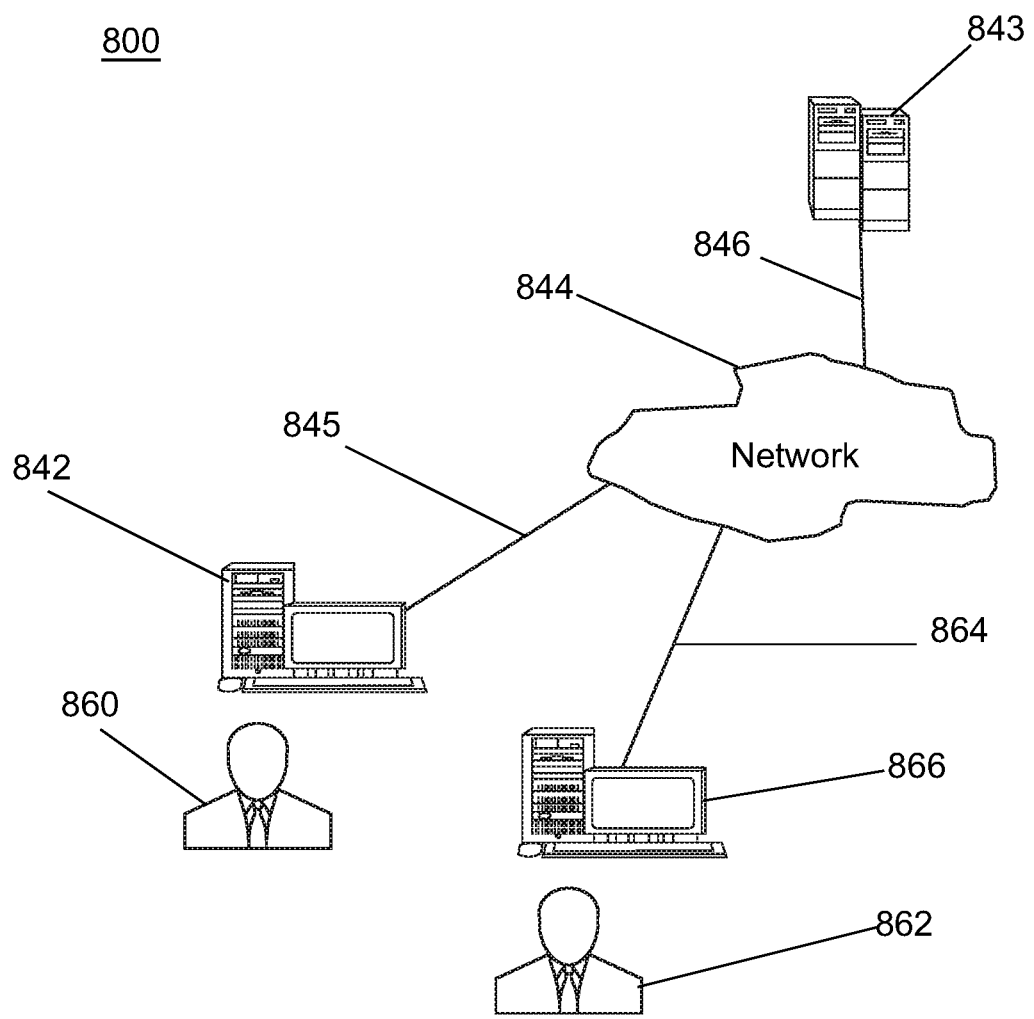
FIG. 8 is a block diagram of various exemplary system components for use in accordance with aspects of the present disclosure.

FIG. 8 is a block diagram of various example system components that may be used in accordance with aspects of the present disclosure. For example, the various components may be within the vehicle 102, or only some of the components may be within the vehicle 102, and other components may be remote from the vehicle 102. The system 800 includes one or more accessors 860, 862 (also referred to interchangeably herein as one or more "users") and one or more terminals 842, 866 (such terminals may be or include, for example, various features of the massage seat control system 110). In one aspect, data for use in accordance with aspects of the present disclosure is, for example, input and/or accessed by accessors 860, 862 via terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of controlling a massage function of a vehicle seat, comprising:
    determining that a dedicated physical hardware massage function button located at a fixed position on a dashboard or center console of a vehicle is held for a threshold amount of time of at least 1 second;
    presenting a menu of configuration options on a display of the vehicle in response to the dedicated physical hardware massage function button being held for the threshold amount of time of at least 1 second;
    receiving a signal indicating that the dedicated physical hardware massage function button is pressed for less than the threshold amount of time; and
    activating the massage function according to a stored selection of the configuration options in response to the signal indicating that the dedicated physical hardware massage function button is pressed for less than the threshold amount of time of at least 1 second.

2. The method of claim 1, further comprising:
    receiving at least one additional signal indicating that the dedicated massage function button is pressed for less than the threshold amount of time; and
    adjusting an intensity of the massage function in response to the at least one additional signal, wherein the adjusting the intensity comprises cycling the intensity through changing levels of intensity including high intensity, medium intensity, low intensity, and off in response to each additional signal.

3. The method of claim 2, wherein the adjusting the intensity comprises indicating a current intensity via one or more lights on the dedicated physical hardware massage function button.

4. The method of claim 1, further comprising:
    receiving a selection of configuration options for the vehicle seat from the configuration options presented on the display of the vehicle; and
    storing the selection of configuration options for the vehicle seat to be activated by pressing the dedicated physical hardware massage function button.

5. The method of claim 4, wherein the selection of configuration options is stored in association with a driver profile.

6. The method of claim 4, wherein the selection of configuration options is stored as a set of most recent configuration options.

7. The method of claim 1, wherein receiving the selection of configuration options comprises receiving the selection of the configuration options via a second input other than the dedicated physical hardware massage function button.

8. The method of claim 1, wherein receiving the signal indicating that the dedicated physical hardware massage function button is pressed for less than the threshold amount of time occurs when the display does not present the configuration options.

9. The method of claim 1, wherein activating the massage function comprises presenting a notification including the selection of configuration options on the display in response to the signal indicating that the dedicated physical hardware massage function button is pressed for less than the threshold amount of time.

10. The method of claim 1, further comprising:
starting a timer in response to the signal indicating that the dedicated physical hardware massage function button is pressed for less than the threshold amount of time; and
stopping the massage function when the timer expires.

11. The method of claim 10, further comprising:
resetting the timer in response to the dedicated physical hardware massage function button being pressed prior to the expiration.

12. A vehicle control system controlling a massage function of a vehicle seat, comprising:
a dedicated physical hardware massage function button located at a fixed position on a dash or a console of the vehicle;
a display configured to present at least a selection of vehicle configuration options;
a memory; and
a processor communicatively coupled to the memory, the processor configured to:
determine that the dedicated physical hardware massage function button is held for a threshold amount of time of at least 1 second;
present a menu of the configuration options on the display of the vehicle in response to the dedicated physical hardware massage function button being held for the threshold amount of time of at least 1 second;
receive a signal indicating that the dedicated physical hardware massage function button is pressed for less than the threshold amount of time of at least 1 second; and
activate the massage function according to a stored selection of configuration options in response to the signal indicating that the dedicated physical hardware massage function button is pressed for less than the threshold amount of time.

13. The vehicle control system of claim 12, wherein the processor is configured to cycle an intensity of the massage function through changing levels of intensity in response to receiving the signal indicating that the dedicated physical hardware massage function button is pressed at least a second time, wherein the changing levels of intensity include high intensity, medium intensity, low intensity, and off.

14. The vehicle control system of claim 12, wherein the processor is configured to:
receive, from a user, a selection of configuration options for the vehicle seat from the vehicle configuration options presented on the display; and
store the selection of configuration options for the vehicle seat in the memory to be activated by pressing the dedicated physical hardware massage function button.

15. The vehicle control system of claim 14, wherein the selection of configuration options is stored in association with a driver profile or as a set of most recent configuration options.

16. The vehicle control system of claim 15, wherein the menu of the configuration options includes an option to select between storing the selection of the configuration options in association with the driver profile or as the set of most recent configuration options.

17. The vehicle control system of claim 12, wherein the processor is configured to receive the selection of the configuration options via a second input other than the dedicated physical hardware massage function button.

18. The vehicle control system of claim 12, wherein the processor is configured to display a notification including the selection of configuration options on the display in response to the signal indicating that the dedicated physical hardware massage function button is pressed for less than the threshold amount of time.

19. The vehicle control system of claim 12, wherein the processor is configured to:
start a timer in response to the signal indicating that the dedicated physical hardware massage function button is pressed;
reset the timer in response to the dedicated physical hardware massage function button being pressed prior to an expiration of the timer; and
stop the massage function in response to the expiration of the timer.

20. A vehicle comprising:
a vehicle seat including a plurality of actuatable massage elements;
a dedicated physical hardware massage function button located at a fixed position on a dash or a console of the vehicle;
a display configured to present at least a selection of vehicle configuration options;
a memory; and
a processor communicatively coupled to the memory, the processor configured to:
determine that the dedicated physical hardware massage function button is held for a threshold amount of time of at least 1 second;
present a menu of the configuration options on the display of the vehicle in response to the dedicated physical hardware massage function button being held for the threshold amount of time of at least 1 second;
receive a signal indicating that the dedicated physical hardware massage function button is pressed for less than the threshold amount of time of at least 1 second; and
activate the plurality of actuatable massage elements according to a stored selection of configuration options in response to the signal indicating that the dedicated physical hardware massage function button is pressed for less than the threshold amount of time.

* * * * *